J. F. TINGSTROM.
LUNCH BOX.
APPLICATION FILED JAN. 18, 1921.
1,412,761.
Patented Apr. 11, 1922.
2 SHEETS—SHEET 1.
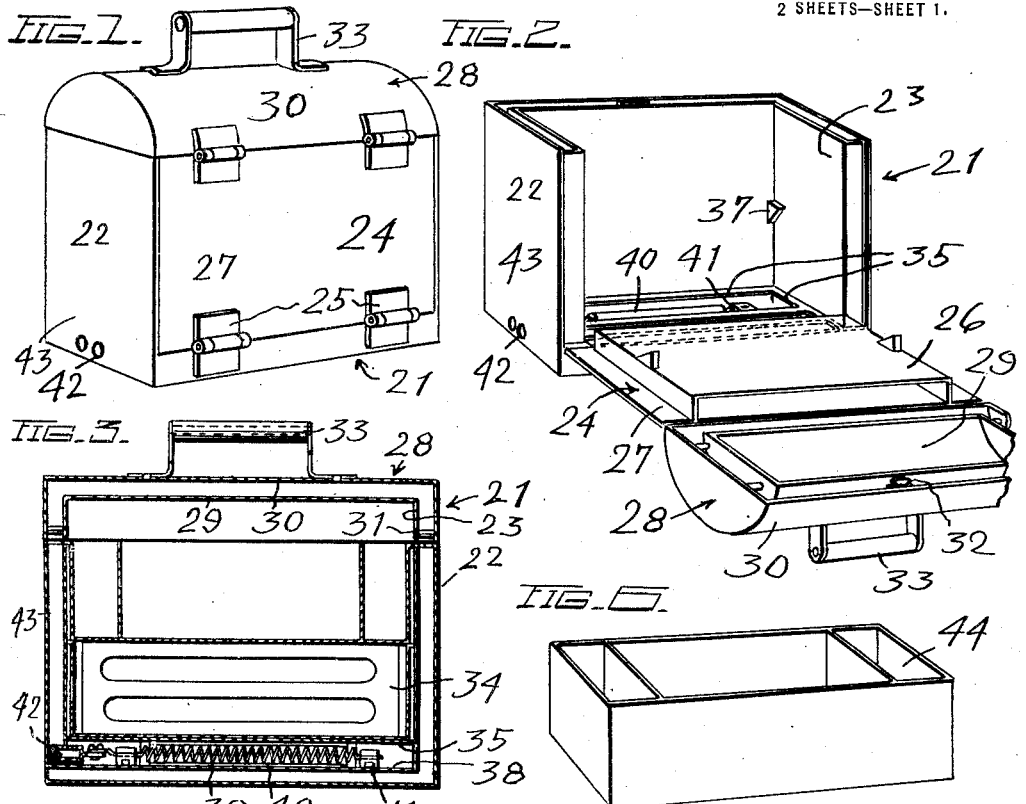
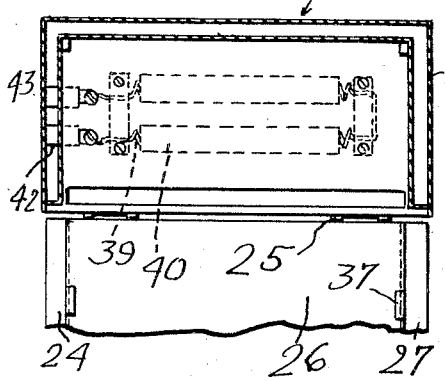
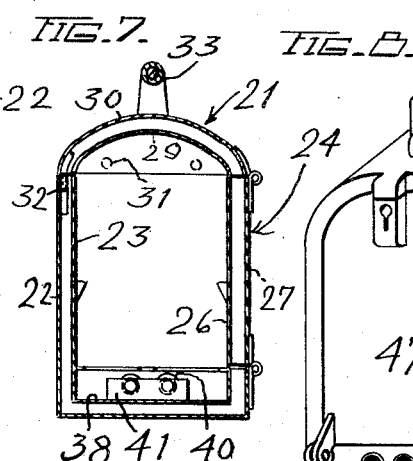
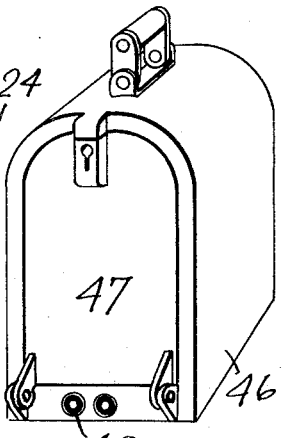
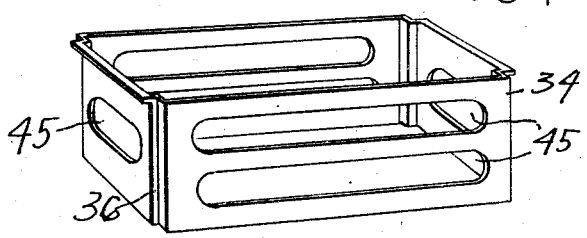
INVENTOR:
Jesse F. Tingstrom.
By
Frederic M. Keeney.
Atty.

J. F. TINGSTROM.
LUNCH BOX.
APPLICATION FILED JAN. 18, 1921.
1,412,761.
Patented Apr. 11, 1922.
2 SHEETS—SHEET 2.
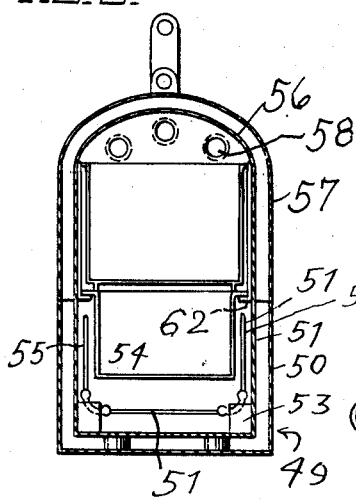
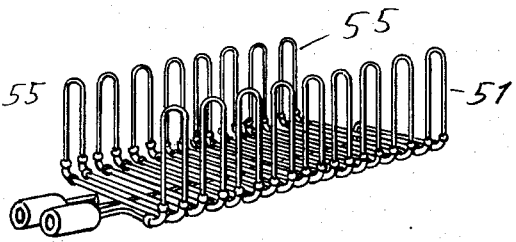
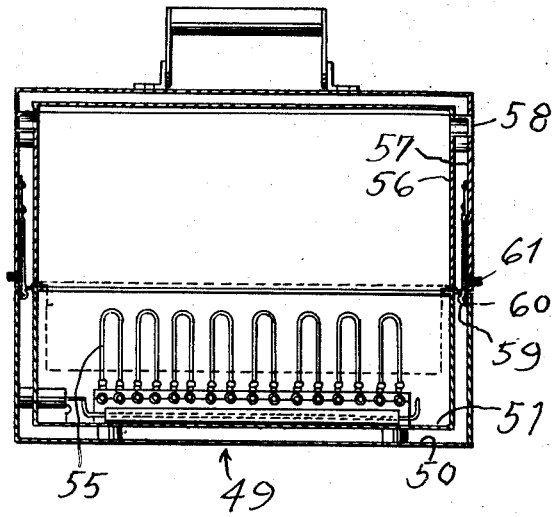
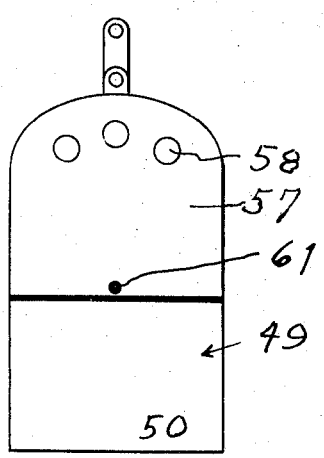
INVENTOR:
Jesse F. Tingstrom.
By
Frederic M. Keeney.
Atty.

UNITED STATES PATENT OFFICE.

JESSE F. TINGSTROM, OF LOS ANGELES, CALIFORNIA.

LUNCH BOX.

1,412,761. Specification of Letters Patent. Patented Apr. 11, 1922.

Application filed January 18, 1921. Serial No. 438,215.

*To all whom it may concern:*

Be it known that I, JESSE F. TINGSTROM, a citizen of the United States, residing in the city and county of Los Angeles and State of California, have invented a new and useful Lunch Box, of which the following is a specification.

The present invention relates to an improved electric device particularly adapted for a lunch-box and adapted to heat the contents thereof, by the application of an electric current thereto.

The objects of the invention are to provide a device of this character, having a capacity for the greatest amount of heat at a minimum cost of production, to provide a device having a thermostatic arrangement of walls to retain the heat therein for a considerable time, and to provide a conveniently arranged lunch-box, which, when opened, may be utilized as a tray for serving the lunch.

Heretofore, the method for warming the lunch in a lunch-box consisted of placing the lunch-box with contents therein, over a fire or near a furnace, if the means for heating the lunch-box were conveniently at hand. At the present time, practically every factory and work-shop is provided with electricity as a lighting means, and with no other available source of heat, so that the lunch is eaten in a cold state.

My invention consists therefore, in constructing a lunch-box having thermostatically arranged walls, and provided with electric heating elements therein, and suitable trays disposed above the heating elements and adapted to carry the eatables, the box having holes adapted to receive the plug conduit terminals.

Upon the annexed drawings, Figure 1 is a perspective view of a lunch-box embodying the present invention. Fig. 2 is a perspective view of the same in open position. Fig. 3 is a sectional view of the lunch-box. Fig. 4 is a fragmentary and sectional plan view showing the bottom part of the interior. Fig. 5 is a perspective view of the lowermost tray detached from the box. Fig. 6 is a similar view of the uppermost tray. Fig. 7 is a transverse and vertical sectional view of the box. Fig. 8 is a perspective view of a modified form of box in which the cover is arranged on one end thereof. Fig. 9 is a vertical and sectional view of a modified form of the box. Fig. 10 is a perspective detail view of the heating elements therefor. Fig. 11 is a vertical and longitudinal sectional view of the box shown in Fig. 9. Fig. 12 is an end elevation of the same.

Referring to the drawings, my improved lunch-box consists of a receptacle 21, having an outer wall 22, and an inner wall 23 spaced apart therefrom, to provide a layer of air between the interior and exterior of the receptacle. The receptacle is adapted to open at one side and the top. The side cover 24, connected by hinges 25, to the receptacle, is provided with an inner wall 26 spaced apart from the outer wall 27, so as to form an air passage between the two walls. The top portion 28, of the cover, is similarly provided with an inner wall 29 and an outer wall 30, the arrangement being such, that when the lunch-box is closed, a practically continuous air space is provided between the interior and exterior of the box. The inner wall 29 is supported by bolts 31. A lock 32 serves to retain the box in closed position. The cover member 28 is provided with a carrying handle 33.

The lowermost tray 34 is supported by inwardly projecting ribs 35, and is provided with recessed corners 36, so that the tray may be lowered beside the lugs 37, which support the uppermost tray. Within the interior and adjacent to the bottom wall 38, I provide electric heating elements, consisting of wire coils 39, of high resistance, enclosed by porcelain tubes 40, and supported by porcelain blocks 41, or blocks of suitable insulating material which withstand the heat. Socket terminals 42, are inserted in the end wall 43, and connected to the heating coils. These are adapted for use with terminal conduit plugs and cord (not shown), but of which there are many on the market, and in use. The uppermost tray is provided with narrow end compartments 44, and a larger central compartment. The lowermost tray has its sides and ends pierced with apertures 45. These apertures provide for the circulation of heated air around the bottom of the uppermost tray.

In the modified form shown in Fig. 8, the box 46, is provided with an end cover 47. Socket terminals 48 are below the cover.

In the modified form shown in Fig. 9, the box receptacle 49, is provided with double walls consisting of an outer wall 50 and an inner wall 51. The heating elements consist of a line of wire 52 of high resistance, and supports 53, therefor. The lowermost tray is supported by flanges 62, and the uppermost tray by the lower tray. The lower tray 54 is narrower than the upper tray to accommodate the side loops 55, of the heating elements.

The cover forms the top portion of the box, and consists of the inner wall 56 and outer wall 57, spaced apart by elements 58. In the assembled position, the spring catches 59 engage with lugs 60. To remove the cover, the projecting buttons 61 are depressed, and the cover removed.

From the foregoing it may be seen that I have provided a lunch-box having efficient means for heating and warming the contents thereof, and for retaining the contents in the heated state for some time; the essential elements of my invention consisting of a double-walled box capable of retaining the heat therein, and electric heating elements disposed within the box.

What is claimed is:

1. In a lunch-box, the combination with a double-walled and thermostatically arranged receptacle, of trays supported therein, a cover therefor, thermostatic walls for the cover and cooperating with the walls of the receptacle in the closed position to form a continuous air space between the exterior and the interior of the box, means for locking the box in the closed position, electric heating coils disposed within the interior of the box and adjacent to the bottom thereof, and socket terminals disposed in the walls of the box and connected to the heating coils.

2. In a lunch-box, the combination with a receptacle having outer and inner spaced apart walls, of a double sectioned cover therefor, and forming a closure for the side and top in the closed position of the box, outer and inner walls for the cover sections cooperating with the outer and inner walls of the receptacle to form a continuous air space around the box, and electric heating elements disposed within the interior of the box.

3. In a lunch-box, the combination with a thermostatic-walled receptacle having outer and inner walls, a cover therefor and having similar outer and inner walls cooperating with the walls of the receptacle to form an air space around the box, of electric heating elements within the interior of the box and adjacent to the bottom thereof, socket terminals mounted in the walls and connected to the heating elements, trays disposed within the interior of the box, and supports for the trays projecting from the inner wall.

4. In a lunch-box, the combination with a receptacle having outer and inner walls, of a cover cooperating with the walls of the receptacle to form an air space between the interior and exterior of the receptacle in the closed position, trays disposed within the receptacle, means for maintaining the trays in spaced relation with one another to form a layer of circulating air between the trays, and electric heating elements disposed within the receptacle and beneath the trays.

5. In a lunch-box, the combination with a receptacle having outer and inner walls, of a cover having outer and inner walls cooperating with the walls of the receptacle to form an air space around the box in the closed position thereof, upper and lower trays within the receptacle, means for maintaining the trays in spaced apart relation with one another, electric heating elements within the receptacle and beneath the lowermost tray, electric socket terminals mounted in the walls of the receptacle and arranged for insertion of connecting plugs in the closed position of the box, said socket terminals being connected to the heating elements, and means for maintaining the trays in spaced relation to the heating elements.

6. In a lunch-box, the combination with a receptacle having outer and inner walls in spaced apart relation to one another, a cover therefor having similar spaced apart walls cooperating with the walls of the receptacle to form an air space around the box in closed position, electro-thermostatic elements within the receptacle, means for forming connection with an exterior electric circuit, and spring catches serving to maintain the cover and the receptacle in closed position.

In testimony whereof, I hereunto affix my signature, this 7th day of January, 1921.

JESSE F. TINGSTROM.